United States Patent
Ishida et al.

(10) Patent No.: US 7,359,997 B2
(45) Date of Patent: Apr. 15, 2008

(54) USB DATA TRANSFER CONTROL DEVICE INCLUDING FIRST AND SECOND USB DEVICE WHEREIN DESTINATION INFORMATION ABOUT SECOND DEVICE IS SENT BY FIRST DEVICE

(75) Inventors: Takuya Ishida, Sapporo (JP);
Yoshiyuki Kamihara, Sapporo (JP);
Nobuharu Kobayashi, Sapporo (JP);
Haruo Nishida, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 469 days.

(21) Appl. No.: 10/859,082

(22) Filed: Jun. 3, 2004

(65) Prior Publication Data
US 2005/0015523 A1  Jan. 20, 2005

(30) Foreign Application Priority Data
Jun. 6, 2003 (JP) .............................. 2003-162215

(51) Int. Cl.
*G06F 13/36* (2006.01)
*G06F 3/00* (2006.01)
(52) U.S. Cl. .................. 710/31; 710/15; 710/33; 710/52; 710/53; 710/56; 710/305
(58) Field of Classification Search ............... 710/31, 710/15, 53, 52, 56, 305, 33
See application file for complete search history.

(56) References Cited

U.S. PATENT DOCUMENTS

| | | | |
|---|---|---|---|
| 6,389,029 B1 * | 5/2002 | McAlear | 370/402 |
| 6,732,205 B2 | 5/2004 | Kamihara | |
| 6,816,929 B2 * | 11/2004 | Ueda | 710/56 |
| 7,028,109 B2 * | 4/2006 | Saito et al. | 710/33 |
| 7,028,111 B2 * | 4/2006 | Chang et al. | 710/52 |
| 7,058,747 B2 * | 6/2006 | Chang et al. | 710/305 |
| 2001/0056513 A1 * | 12/2001 | Ueda | 710/100 |

FOREIGN PATENT DOCUMENTS

| | | |
|---|---|---|
| JP | A-2000-196648 | 7/2000 |
| JP | A-2000-209238 | 7/2000 |
| JP | A-2000-261447 | 9/2000 |
| JP | A-2001-282701 | 10/2001 |
| JP | A-2002-009849 | 1/2002 |
| JP | A-2002-055936 | 2/2002 |
| JP | A-2002-073520 | 3/2002 |
| JP | A 2002-135132 | 5/2002 |
| JP | A-2002-290424 | 10/2002 |
| JP | A-2002-300229 | 10/2002 |
| JP | A-2003-114871 | 4/2003 |

* cited by examiner

*Primary Examiner*—Tammara Peyton
(74) *Attorney, Agent, or Firm*—Oliff & Berridge, PLC

(57) ABSTRACT

A transfer controller (or a host controller) issues IN tokens to a plurality of USB devices connected to USB and including first and second USB devices. When data including destination information which specifies the second USB device as a destination has been received in response to an IN token issued to the first USB device, the transfer controller issues an OUT token to the second USB device and transmits the received data from the first USB device to the second USB device. The transfer controller issues an IN token to at least one of the USB devices which has declared itself to be a local area network (LAN) node.

14 Claims, 10 Drawing Sheets

OUT TRANSACTION

IN TRANSACTION

USB DATA TRANSFER CONTROL DEVICE INCLUDING FIRST AND SECOND USB DEVICE WHEREIN DESTINATION INFORMATION ABOUT SECOND DEVICE IS SENT BY FIRST DEVICE

Japanese Patent Application No. 2003-162215, filed on Jun. 6, 2003, is hereby incorporated by reference in its entirety.

BACKGROUND OF THE INVENTION

The present invention relates to a data transfer control device, an electronic instrument, and a data transfer control method.

The universal serial bus (USB) is known in the art as a serial bus interface for connecting a host, such as a personal computer, and peripheral devices. A lot of attention has been paid to the settling on USB 2.0 as a standard that enables the implementation of fast transfer speeds of 480 Mbps (HS mode), while maintaining compatibility with the existing USB 1.1 standard (refer to Japanese Patent Laid-Open No. 2002-135132).

USB differs from IEEE 1394 in that the host has the initiative for data transfer. In other words, the side that issues a transaction for data transfer is the host and a large part of control relating to the data transfer is done by the host. When exchanging data between USB devices (peripheral devices), therefore, it is necessary to provide a personal computer and connect those USB devices to that personal computer. For that reason, it is difficult to transfer data between USB devices in a peer-to-peer fashion.

With this IEEE 1394, IPover1394 is defined as a protocol for implementing the Internet protocol (IP) on an IEEE 1394 bus. This IPover1394 makes it possible to transfer an IP packet obtained by attaching a transmission control protocol (TCP) header and Internet protocol (IP) header to application data, thus enabling the implementation of a local area network (LAN) using IEEE 1394.

With USB, however, there is a technical problem in that a USB device cannot be made to operate as a LAN node (IP node), regardless of whether a protocol such as IPover1394 is defined.

BRIEF SUMMARY OF THE INVENTION

According to one aspect of the present invention, there is provided a data transfer control device for a host which transfers data through a universal serial bus (USB), the data transfer control device comprising:
  a data buffer which temporarily stores transfer data; and
  a transfer controller which controls data transfer, wherein:
    the transfer controller issues IN tokens to a plurality of USB devices connected to the USB including a first USB device and a second USB device; and
    when data including destination information which specifies the second USB device as a destination has been transmitted from the first USB device and received by the transfer controller in response to an IN token issued to the first USB device, the transfer controller issues an OUT token to the second USB device and transmits the received data from the first USB device to the second USB device.

According to another aspect of the present invention, there is provided a data transfer control device for a universal serial bus (USB) device which transfers data through a USB, the data transfer control device comprising:
  a data buffer which temporarily stores transfer data; and
  a transfer controller which controls data transfer, wherein:
    when the data transfer control device has no data to be transmitted to another USB device, the data transfer controller transmits a negative acknowledgment (NAK) to a host in response to an IN token from the host; and
    when the data transfer control device has data to be transmitted to another USB device, the data transfer controller transmits data including destination information which specifies another USB device as destination to the host in response to an IN token from the host.

DETAILED DESCRIPTION OF THE EMBODIMENTS

Embodiments of the present invention will be described below. Note that the embodiments described below do not in any way limit the scope of the invention laid out in the claims herein. In addition, all of the elements of the embodiments described below should not be taken as essential requirements of the present invention.

1. USB

Figure 1A:
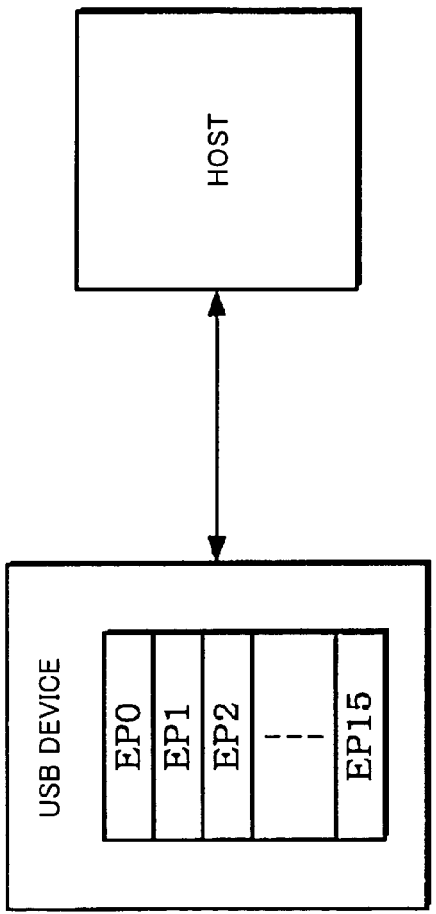
FIGS. 1A, 1B, 1C, and 1D are illustrative of the USB transfer method.

With USB, the host takes the initiative for data transfer. For that reason, the processing load on the host is heavy, but since the personal computer or the like that acts as the host has a high-performance CPU (processor), this is not much of a problem. Since the USB device (USB device or target) need only respond to a request from the host, this has the advantage of simplifying the processing and configuration on the USB device side. To implement this data transfer at the host's initiative with USB, end points (EP0 to EP15) are provided on the USB device side, as shown in FIG. 1A. The host can freely transmission data to any desired end point or receive data from any desired end point, by specifying a device address and end point number.

Note that USB provides four types of data transfer: control transfer, isochronous transfer, interrupt transfer, and bulk transfer. Control transfer is a transfer mode for control applied through end point 0 between the host and the USB device (target). Isochronous transfer is a transfer mode that is provided for the periodic transfer of image and audio data. Interrupt transfer is a transfer mode that is provided for the periodic transfer of small quantities of data at a comparatively low transfer speed. Bulk transfer is a transfer mode that is provided for the transfer of large volumes of data that occur non-periodically.

Figure 1B:
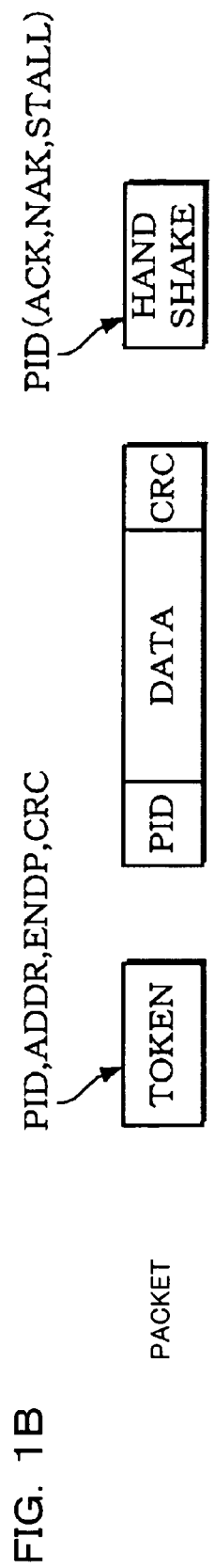

As shown in FIG. 1B, a USB transaction is configured of a token packet, an optional data packet, and an optional handshake packet.

In this case, a token packet is used when the host requests the reading to or writing from an end point of a USB device. This token packet has fields such as PID (a packet ID such as OUT, IN, SOF, or SETUP), ADDR (device address), ENDP (end point number), and CRC (cyclic redundancy check). A data packet is a packet for sending the actual body of data, and it has PID (DATA0, DATA1), DATA, and CRC fields. A handshake packet is a packet used by the reception side to inform the transmitter side whether or not data reception was successful, and it has a PID (ACK, NAK, or STALL) field.

Figure 1C:

With an OUT transaction (a transaction whereby the host outputs information to the USB device), the host first sends an OUT token (a token packet) to the USB device, as shown in FIG. 1C. The host then sends OUT data (a data packet) to the USB device. If the USB device succeeds in receiving the OUT data, it sends an ACK (handshake packet) to the host. This implements processing by which the host writes data to the USB device.

Figure 1D:

With an IN transaction (a transaction whereby the host inputs information from the USB device), on the other hand, the host first sends an IN token packet to the USB device, as shown in FIG. 1D. On receiving the IN token packet, the USB device sends IN data (a data packet) to the host. If the host succeeds in receiving the IN data, it sends ACK to the USB device. This implements processing by which the host reads data from the USB device.

Note that "D←H" in FIGS. 1C and 1D means that information is transferred from the host to the USB device and "D→H" means that information is transferred from the USB device to the host.

With the USB shown in FIGS. 1C and 1D, the initiative for data transfer lies with the host in that the host issues an OUT token if it is write processing and it issues an IN token if it is read processing. This therefore raises a technical problem in that a host is always necessary when exchanging data between USB devices. Another technical problem is that protocols such as IPover1394 are not defined by IEEE 1394 and a USB device cannot be made to operate as a LAN node (IP node).

2. Configuration

Figure 2:
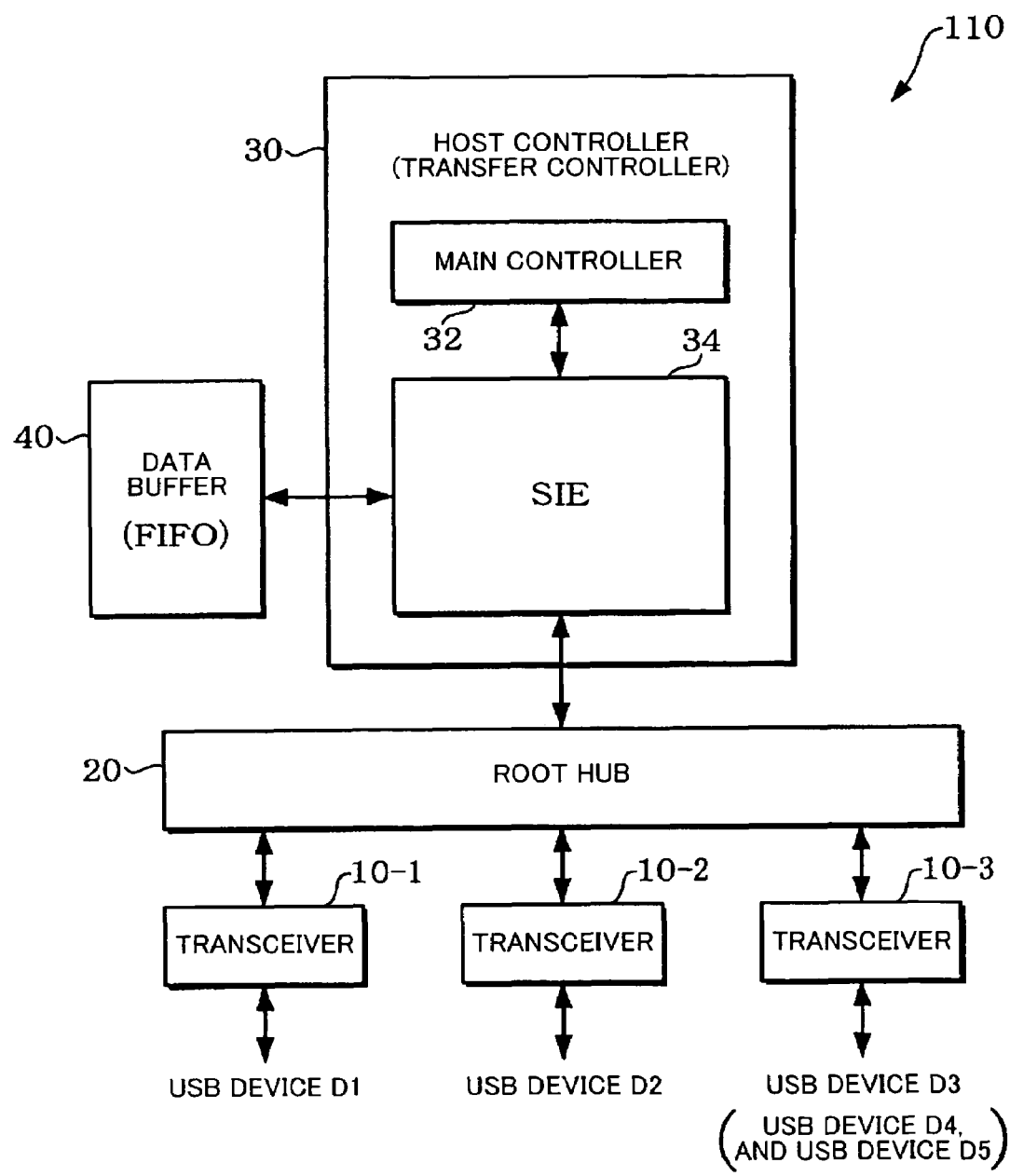
FIG. 2 shows the configuration of a data transfer control device according to one embodiment of the present invention.

The configuration of the data transfer control device (data transfer control circuit and data transfer control IC) according to one embodiment of the present invention which solves the above described technical problems is shown in FIG. 2. Note that a configuration that omits some of the functional blocks of FIG. 2 could also be used. The functional blocks of FIG. 2 could be implemented by hardware or by both hardware and firmware (software).

A data transfer control device 110 includes transceivers 10-1, 10-2, and 10-3. These transceivers 10-1, 10-2, and 10-3 are circuits which transfer USB (generally speaking: a bus) data using differential data signals DP and DM, and which include USB physical-layer circuitry. The transceivers 10-1, 10-2, and 10-3 are configured so that USB devices D1, D2, and D3 can be connected thereto by USB ports (first to third USB ports). Note that the number of transceivers (USB ports) is not limited to three; there could be one or two of them, or there could be four or more of them.

The data transfer control device 110 includes a root hub 20. This root hub 20 is a hub that is connected directly to a host controller 30. The root hub 20 provides connections between the host controller 30 and one or a plurality of USB ports.

The data transfer control device 110 includes the host controller 30 (generally speaking: a transfer controller, hereinafter the same). This host controller 30 is designed to control data transfer over USB. More specifically, it performs processing such as that of issuing IN tokens (IN token packets) and OUT tokens (OUT token packets), assembling and disassembling packets, issuing handshake packets, and controlling the phases of data transfer.

Note that the host controller 30 of this embodiment could be provided with the host functions required of a host controller of a personal computer, or it could be provided with the simple host functions required of a host controller under the USB On-The-Go (OTG) standard (functions for at least creating IN transactions and OUT transactions, and performing control transfer.

The host controller 30 includes a main controller 32 (CPU or processor) and a serial interface engine (SIE) 34. The main controller 32 is designed to control aspects such as the processing sequence of the host controller 30 and operates by means of a USB driver and software, by way of example. The SIE 34 executes USB packet handling processing and transaction management processing, etc.

The data transfer control device 110 includes a data buffer 40 (FIFO or packet buffer). The data buffer 40 is designed to temporarily store (buffer) data that is transferred through USB (transmission data or receive data). This data buffer 40 could be configured of random-access memory (RAM).

Figure 3:
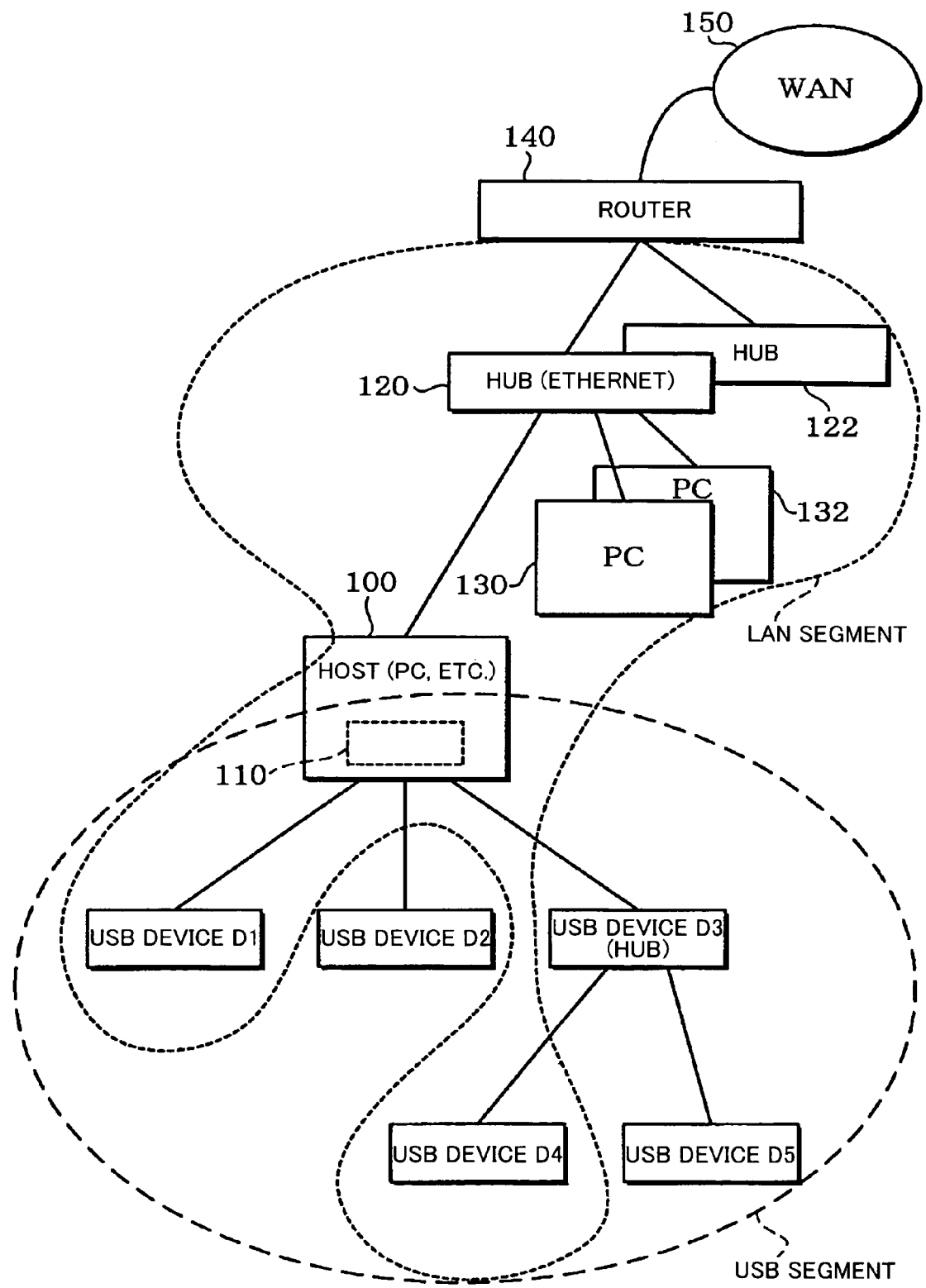
FIG. 3 shows an example of a network system according to one embodiment of the present invention.

An example of a network system according to one embodiment of the present invention is shown in FIG. 3.

A host 100 (electronic instrument) such as a personal computer (PC) includes the data transfer control device 110 of FIG. 2. The USB devices D1, D2, and D3 are connected to a plurality of USB ports (downstream) of the host (the data transfer control device 110). In this case, the USB device D3 is a USB hub and USB devices D4 and D5 are connected to USB ports (downstream) of this USB device D3. A USB segment is configured of this host 100 and the USB devices D1 to D5.

The host 100 is connected to a hub 120 (Ethernet (registered tradename)) by means such as a 10Base-T or 100Base-T cable. Other personal computers 130 and 132 are connected to this hub 120 by means such as a 10Base-T or 100Base-T cable. A router 140 is also connected to the hub 120, and another hub 122 is connected to that router 140. An even larger wide-area network (WAN) is connected to the router 140 that is at the root location of the LAN, to enable connection to the Internet or the like. With this embodiment, the router 140, the hubs 120 and 122, the PCs 100, 130, and 132, and the USB devices D1 and D4 together configure a LAN segment.

Note that a LAN is a data communications system that enables a large number of independent devices (PCs, workstations, peripheral equipment) to communicate directly through physical transfer paths (such as coaxial cables, optical fiber cables, electromagnetic waves, or infrared) having a suitable data transfer speed (such as at least 10 Mbps) within a suitable distance (such as one office or floor, within a building, or between a plurality of buildings).

With IEEE 1394, transactions can be issued from a uniform standpoint for all nodes connected to the bus. In contrast thereto, USB places the initiative on the host, so it is not possible to be active (issue transactions or commands) from the device side. With USB, protocols such as the IPover1394 of IEEE 1394 are not defined. For that reason, a USB device belonging to a USB segment is unable to contact a LAN segment (LAN node or IP node) in the prior art. In other words, it is possible to set up a LAN using IEEE 1394, but it is not possible to set up a LAN by using USB.

In contrast thereto, the data transfer control device 110 of this embodiment shown in FIG. 2 enables a USB device to operate as a LAN node, making it possible to use USB when setting up a LAN. For that purpose, the data transfer control device 110 of FIG. 2 performs the processing described below.

In this embodiment, the host controller 30 issues an IN token (IN token packet) to ask each USB device connected by USB whether or not it has data to be transmitted to another USB device. In this case, the IN token is issued to at least one USB device that has declared that it is a LAN node (or an IP node having an IP address in a narrow sense), of the plurality of USB devices connected to USB. In other words, the IN token is issued to each USB device belonging to the LAN segment. For example, an IN token is issued to the USB devices D1 and D4 in FIG. 3.

If the host controller 30 issues an IN token to the USB device D1 which is part of a LAN segment and receives a negative acknowledgment (NAK) from the USB device D1 as a response, for example, it then issues an IN token to the USB device D4 which is another part of the LAN segment. In other words, it issues IN tokens sequentially to each USB device belong to a LAN segment (each USB device declared to be a LAN node).

Note that the IN token issued to the USB device D4 goes through the USB device D3 that is a hub. The determination as to whether or not a USB device has declared itself to be a LAN node can be based on the descriptor (device descriptor) returned from that USB device in response to a device request which is GetDescriptor.

The configuration could be such that, if the host controller 30 issues an IN token to the USB device D1 that is part of the LAN segment and receives a zero-length packet (a packet of zero length, or a short packet) back from the USB device D1 in response, it then issues an IN token to the USB device D4 which is another part of the LAN segment. This zero-length packet is used in circumstances such as when data transfer by I/O request packets (IRPs) is to end. If the host controller 30 receives a zero-length packet as response to the IN token issued to the USB device D1, it transmits an acknowledgement (ACK) handshake packet to the USB device D1. It then issues an IN token to the USB device D4 which is another part of the LAN segment.

The issue of the IN tokens by the host controller 30 can be done periodically by using interrupt transfers or the like, by way of example. In other words, the host controller 30 controls and manages the packet transfer sequence and instructs the transfer of packets for each transfer type. For that reason, the host controller 30 performs frame management and issues a start-of-frame (SOF) packet to the USB devices (peripheral equipment) every frame (1 ms, or 125 µs). In this case, the SOF is a token packet for denoting the start of the frame, which includes a PID, a frame number, and a CRC. A frame is the interval from one SOF to the next SOF. The host controller 30 is configured to perform scheduling management to ensure that one transaction does not extend over a plurality of frames. By using this SOF, the host controller 30 can issue IN tokens for command reception periodically to the USB devices.

Note that the issue of IN tokens could also be done periodically or non-periodically by using bulk transfer. Alternatively, it could issue IN tokens by using another transfer mode (isochronous transfer or control transfer).

If the host controller 30 receives data without a NAK (handshake packet), that is, data that is not zero-length, in response to an IN token issued to a USB device, it analyzes the received data. Assume by way of example that the host controller 30 receives data (a data packet) containing destination information (a destination ID) that specifies the USB device D4 (generally speaking: a second USB device, hereinafter the same) in response to an IN token issued to the USB device D1 (generally speaking: a first USB device, hereinafter the same). When that happens, the host controller 30 issues an OUT token to the USB device D4 specified by the thus-received destination information. It then transmits the data (application data such as image data, sound data, or print data) received from the USB device D1 to the USB device D4.

Conversely, if it receives data containing destination information that specifies the USB device D1 as destination in response to an IN token issued to the USB device D4, for example, it issues an OUT token to the USB device D1. It then transmits the data received from the USB device D4 to the USB device D1.

This makes it possible to implement peer-to-peer data transfer between USB devices configuring a LAN segment. In other words, the data transfer control device 110 (the host 100) is enabled to function as if it were a USB router, making it possible to implement LAN data transfer by USB.

Note that the above description assumes that there are two USB devices forming the LAN segment, but the present invention also covers configurations in which there are three or more USB devices forming the LAN segment. In such a case too, tokens on the token bus are made to function as USB IN tokens, making it possible to implement data transfer between USB devices configuring a LAN segment.

3. Electronic Instrument

Figure 4A:
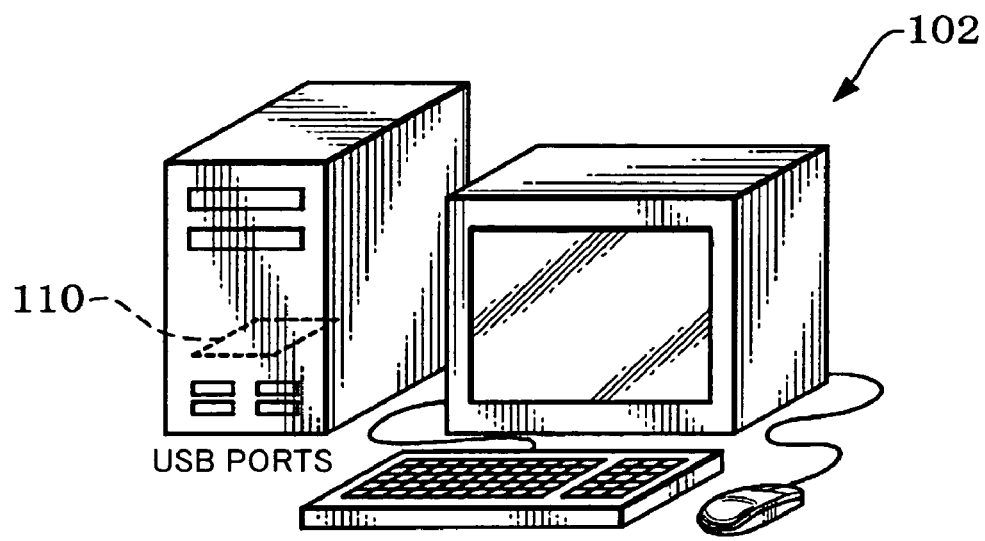
FIGS. 4A and 4B show electronic instruments according to one embodiment of the present invention.
Figure 4B:
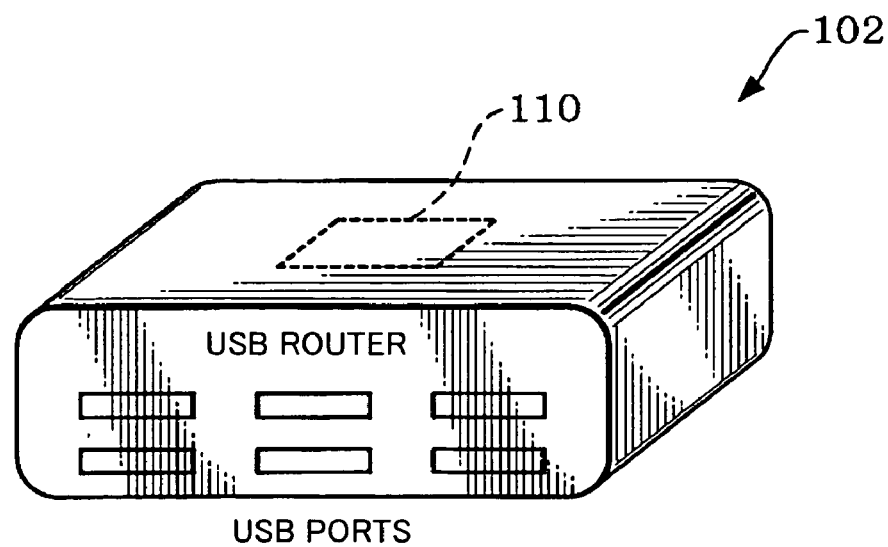

Examples of an electronic instrument 102 (the host 100 of FIG. 3) including the data transfer control device 110 according to one embodiment of the present invention are shown in FIGS. 4A and 4B.

The electronic instrument 102 that includes the data transfer control device 110 of this embodiment can be assumed to be a personal computer (either a desktop type or notebook type) provided with USB ports such as those shown in FIG. 4A. In such a case, the data transfer control method of this embodiment can be implemented by firmware or OS driver software that controls the data transfer control device 110.

The electronic instrument 102 including the data transfer control device 110 of this embodiment could also be a USB router provided with USB ports, as shown in FIG. 4B. This USB router is designed to perform routing processing for determining data transfer paths between USB devices. In the example shown in FIG. 4B, the host controller 30 of the data transfer control device 110 need not necessarily have all the host functions required of a host controller of a personal computer, so it could have simple host functions. In other words, it could have just simple host functions enabling it to perform tasks such as processing for issuing IN tokens to USB devices connected to the USB ports or processing for receiving data including destination information in response to an IN token, issuing an OUT token to the destination USB device, and transmitting the data thereto. Alternatively, it could just have the simple host functions required of a host under the USB On-The-Go (OTG) standard.

Note that the electronic instrument 102 to which this embodiment is applied is not limited to that shown in FIGS. 4A and 4B, provided it is provided with at least the data transfer control device 110 and USB ports for connecting USB devices (including hubs). The electronic instrument 102 could also include components such as a CPU, ROM, RAM, display section, or operating section, in addition to a data transfer control device 110 and USB ports.

4. Data Transfer Control Device for USB Device

Figure 5:
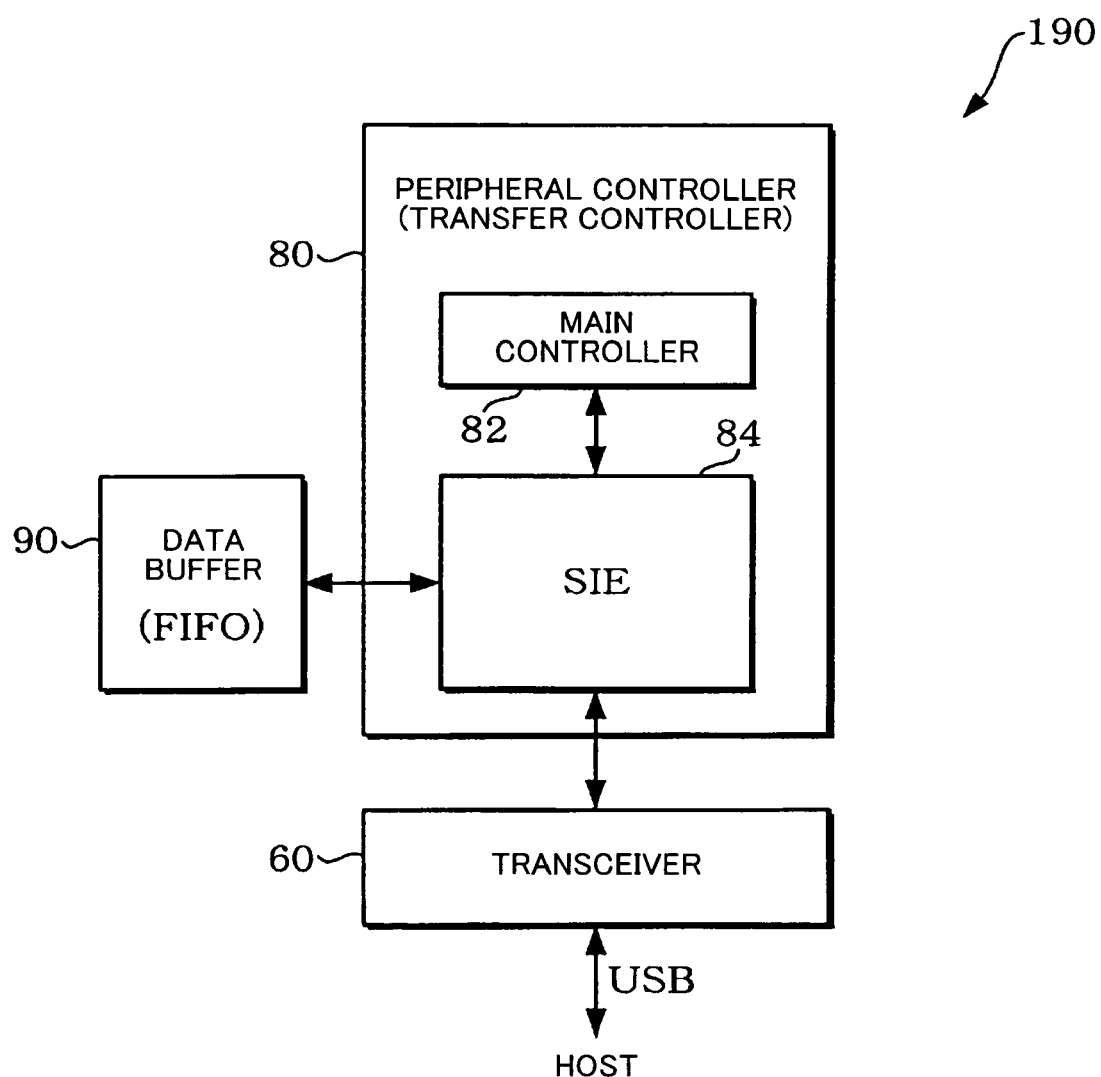
FIG. 5 shows the configuration of a data transfer control device for a USB device according to one embodiment of the present invention.

An example of the configuration of a data transfer control device incorporated on the USB device side is shown in FIG. 5. Note that some of the functional blocks shown in FIG. 5 could be omitted.

This data transfer control device 190 includes a transceiver 60. This transceiver 60 is a circuit for transmitting and receiving USB data, using differential data signals DP and DM. A macrocell conforming to the USB 2.0 Transceiver Macrocell Interface (UTMI) that defines an interface as part of the USB 2.0 physical-layer circuitry and logical-layer circuitry could be used as the transceiver 60.

The data transfer control device 190 includes a peripheral controller 80 (generally speaking: a transfer controller, hereinafter the same). This peripheral controller 80 is intended to control data transfer through USB. Note that a controller that conforms to the OTG standard (a controller having both a peripheral function and a host function) could be used as the peripheral controller 80.

The data transfer control device 190 also includes a data buffer 90 (FIFO, or packet buffer). The data buffer 90 is designed to temporarily store (buffer) data transmission data or receive data) to be transferred through USB. This data buffer 90 can be configured of memory, such as RAM.

If there is data to be transmitted to another USB device configuring the LAN segment, the peripheral controller 80 of this embodiment transmits a NAK (handshake packet) to the host 100 in response to the IN token (token packet) from the host 100 (the data transfer control device 110) of FIG. 3. Note that it could also transmit a zero-length packet (a data packet of zero length) to the host 100 in response to that IN token.

If there is no data to be transmitted to another USB device, on the other hand, the peripheral controller 80 transmits data (a data packet) including destination information (a destination ID) of another USB device in response to the IN token from the host 100. This makes it possible for the USB device including the peripheral controller 80 to operate as a LAN node, enabling the setting up of a LAN using USB.

Note that the USB device including the data transfer control device 110 could be assumed to be various other types of electronic instrument, such as an optical disk drive (CD-ROM or DVD), a magneto-optical disk drive (MO), a hard disk drive, a TV tuner, a video camera, audio equipment, a mobile phone, a projector, a portable information terminal, or an electronic organizer. The USB device (electronic instrument) in this case could also include other components such as a CPU, ROM, RAM, display section, or operating section, in addition to the data transfer control device 190 and the USB ports.

5. Operation

The description now turns to the operation according to one embodiment of the present invention.

5.1 LAN Node Declaration

Figure 6:
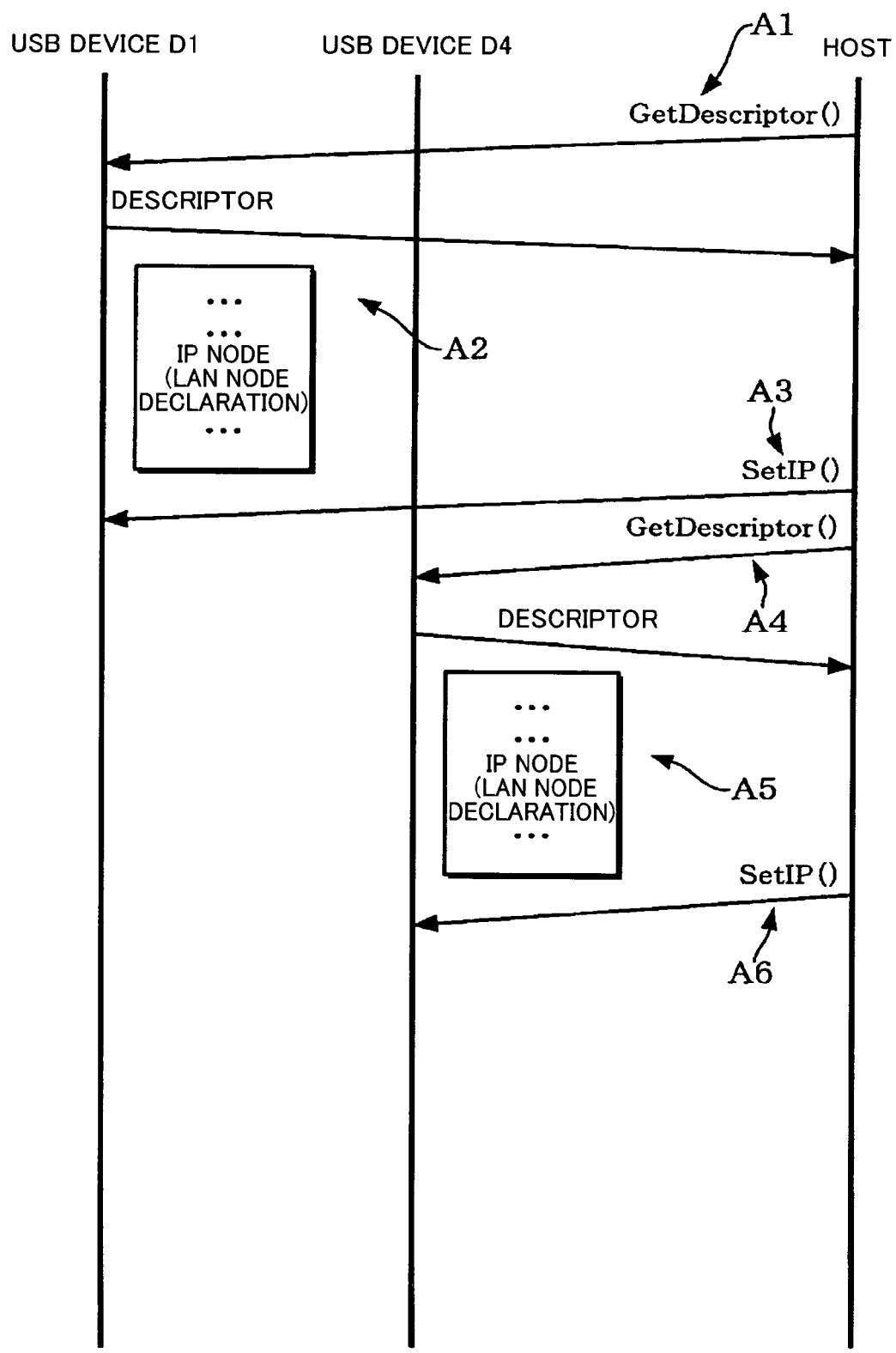
FIG. 6 is illustrative of the operation of LAN node declaration processing.

The operation of LAN node declaration processing for USB devices is shown in FIG. 6.

First of all, the host (host controller, hereinafter the same) issues a device request which is GetDescriptor to the USB device D1, as shown at A1 in FIG. 6. When that happens, if the USB device D1 declares itself to be a LAN node, it describes the LAN node declaration information (information posting that this is a LAN node declaration) in a descriptor (a device descriptor in a narrow sense), and sends that device request back to the host. The LAN node (IP node) declaration information in this case is information that is unique to its vendor or information defined for that device class.

When the host receives the descriptor from the USB device D1, it analyzes that descriptor. It determines whether or not the USB device D1 has performed a LAN node declaration, based on the thus-received descriptor. If it determines that the USB device D1 has made a LAN node declaration, it determines whether or not it is permitted to operate as a LAN node. If it is so permitted, the host issues a SetIP device request to the USB device D1, as shown at A3 in FIG. 6, and transmits information permitting the operation as a LAN node and LAN address (IP address) information to the USB device D1. Note that SetIP is a device request of information that is unique to its vendor or is defined for that device class.

Similarly, the host issues a GetDescriptor device request to the USB device D4, as shown at A4 in FIG. 6. When that happens, if the USB device D4 has made a LAN node declaration, it describes the LAN node declaration information in a descriptor and returns it to the host, as shown at A5.

When the host receives the descriptor from the USB device D4, it analyzes it and determines whether or not the USB device D4 has made a LAN node declaration. If it determines that it is a LAN node declaration, the host issues a SetIP device request to the USB device D4 and transmits information permitting the operation as a LAN node and LAN address (IP address) information to the USB device D4.

The host performs the above-described processing with respect to a plurality of USB devices connected to the USB ports, to specify which of these USB devices form the LAN segment, based on the received descriptors. It then issues IN tokens periodically or non-periodically to the thus-specified USB devices, to implement data transfer by the LAN between the USB devices.

Note that the string of processing of FIG. 6 could be implemented by USB control transfer. Control transfer is a transfer mode for control that is performed through a control end point (an end point having the end point number 0) between the host and the USB devices (targets, or peripherals). This control transfer is configured of a setup stage in which the host sends a device request to the USB. device, a data stage in which data is transferred in the transfer direction specified by the device request, and a status stage in which notification as to whether or not the data transfer was successful is sent.

A device request is a command from the host to a USB device. This device request is a standard device request, a request unique to that device class, or a request unique to its vendor.

In the control transfer setup stage, the host creates a SETUP talk packet and transmits it to the USB device. The host then transmits a SETUP data packet to the USB device. When the USB device has received the SETUP data packet, it transmits an acknowledgement (ACK) handshake packet to the host. When the ACK handshake packet returns from the USB device, the host ends the setup stage.

When the setup stage ends, the processing moves on to the data stage. Note that the processing can proceed to the status stage, skipping the data stage, for a device request with no data stage.

For a device request in which the transfer direction for the data stage is "IN" (such as a GetDescriptor), the host issues an IN transaction in the data stage, to cause the transfer of data from the USB device to the host. If the device request is GetDescriptor, by way of example, the USB device transmits the descriptor included within the IN data to the host (see A2 and A5 in FIG. 6). For a device request in which the transfer direction for the data stage is "OUT" (such as SetDescriptor, or SetIP), on the other hand, the host issues an OUT transaction in the data stage, to cause the transfer of data from the host to the USB device (see A3 and A6 in FIG. 6). When the data stage ends, the processing moves on to the status stage.

Note that the descriptor sent back by the USB device is a device descriptor, a configuration descriptor, interface descriptor, end point descriptor, or a string descriptor. The host uses data such as the wValue in the device request to specify the type of descriptor to acquire. In this case, general information for the USB device is described in a device descriptor. Information relating to the device configuration is described in a configuration descriptor. Information relating to an end point is described in an end point descriptor. A string descriptor is an optional descriptor.

5.2 Data Transfer by LAN Protocol

Figure 7:
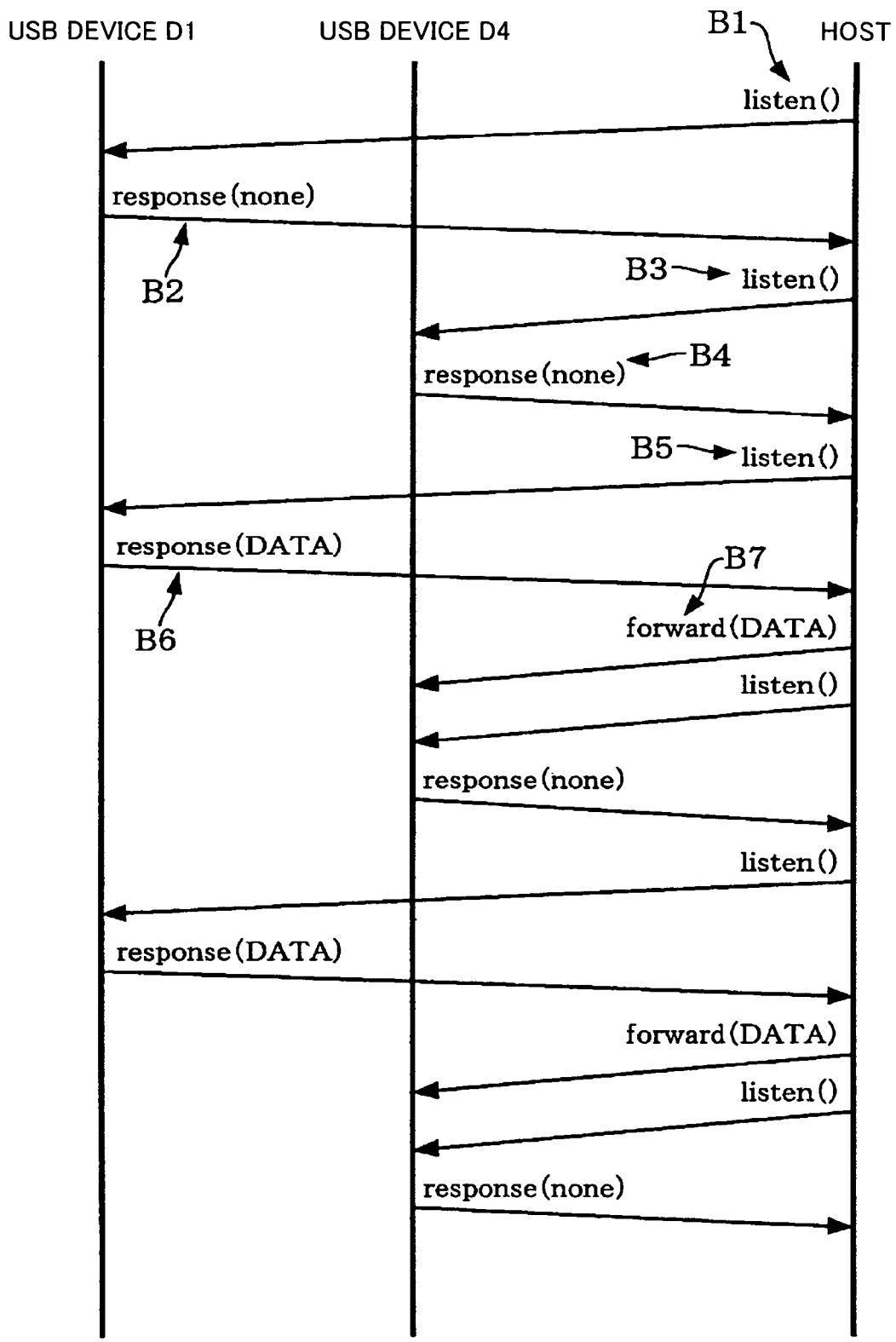
FIG. 7 is illustrative of data transfer by virtual session definition.

The data transfer by a virtual session definition with LAN protocol that is implemented by one embodiment of the present invention is shown in FIG. 7.

First of all, the host polls the USB device D1 that is part of the LAN segment to ask whether or not there is transmission data (data to be transmitted by the LAN), as shown at B1 in FIG. 7. If the USB device D1 has no transmission data for another USB device in the LAN segment, it transmits a "no transmission data" response to the host, as shown at B2.

The host then polls the USB device D4 of the LAN segment to ask whether or not there is transmission data, as shown at B3 in FIG. 7. If the USB device D4 has no transmission data, it transmits a "no transmission data" response to the host, as shown at B4.

The host again polls the USB device D1 to ask whether or not there is transmission data, as shown at B5. If the USB device D1 has transmission data for the USB device D4, for example, it transmits that data to the host, as shown at B6. The host transmits that data to the USB device D4 that is the destination thereof, as shown at B7. By repeating the above processing, it is possible to implement data transfer between a plurality of USB devices belonging to a LAN segment.

Figure 8:
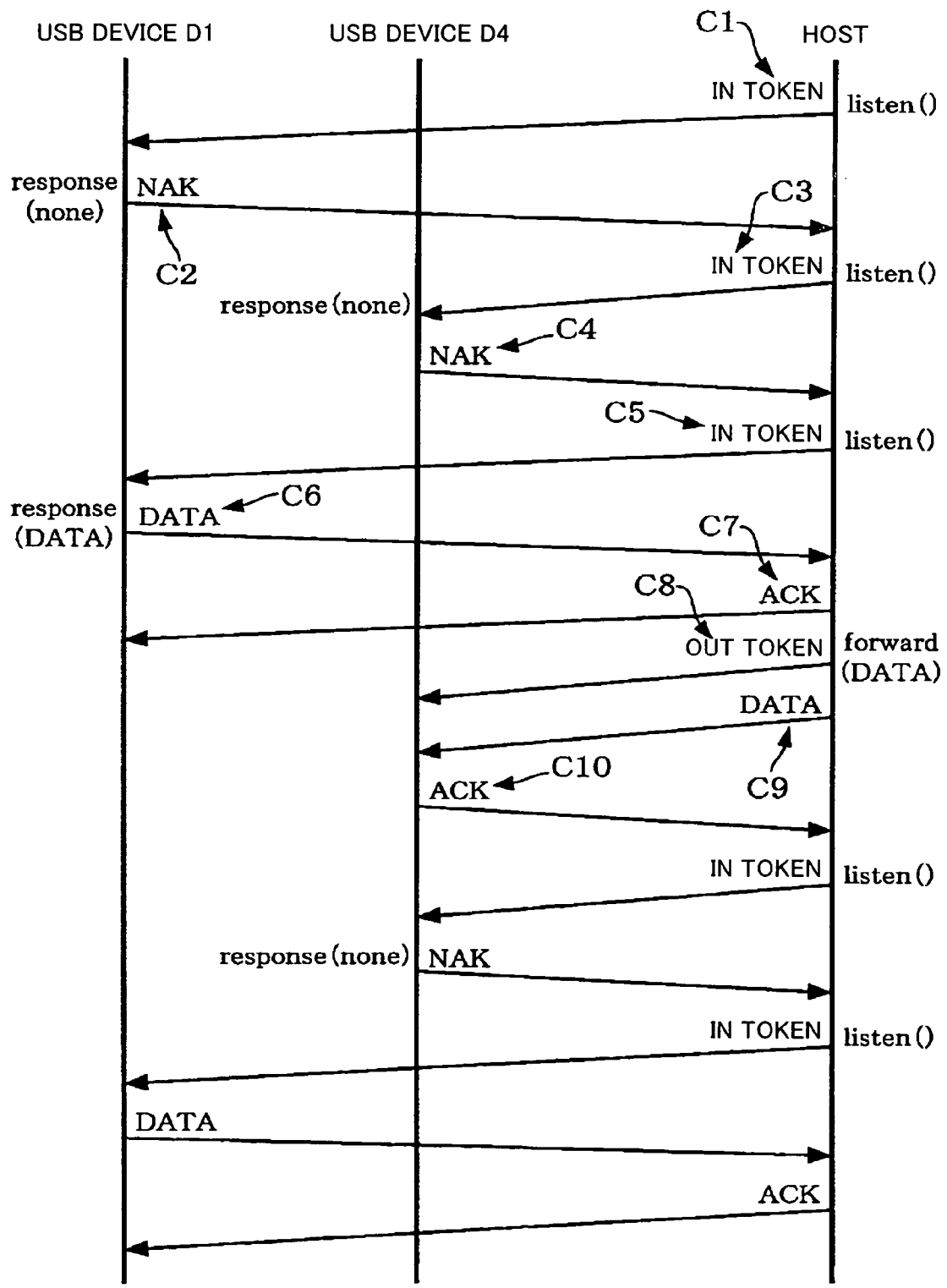
FIG. 8 is illustrative of data transfer by transaction level.

The data transfer of FIG. 7 broken down into USB transactions is shown in FIG. 8.

First of all, the host issues an IN token (IN token packet) to the USB device D1 that is part of the LAN segment, to create an IN transaction, as shown at C1 in FIG. 8. If the USB device D1 does not have transmission data for anther USB device in the LAN segment, it transmits a NAK (a NAK handshake packet) such as that shown at C2 in response to the IN token, within the created IN transaction.

The host then issues an IN token to the USB device D4 that is part of the LAN segment, to create an IN transaction, as shown at C3 in FIG. 8. If the USB device D4 has no transmission data, it transmits a NAK to the host in response to the IN token, as shown at C4.

The host once again issues an IN token to the USB device D1, to create an IN transaction, as shown at C5 in FIG. 8. If the USB device D1 does have transmission data, it transmits data (a data packet including the destination ID for the USB device D4) to the host in response to the IN token, within this IN transaction. When the host succeeds in receiving the data, it transmits an ACK to the USB device D1, as shown at C7.

The host then issues an OUT token (an OUT token packet) to the USB device D4 specified by the destination ID included within the received data, to create an OUT transaction, as shown at C8. The host transmits the data received from the USB device D1 to the USB device D4 in the thus-created OUT transaction, as shown at C9. When the USB device D4 succeeds in receiving the data, it transmits an ACK to the host.

Repeating the above-described processing makes it possible to transfer data in a peer-to-peer fashion between USB devices belonging to a LAN segment.

Figure 9:
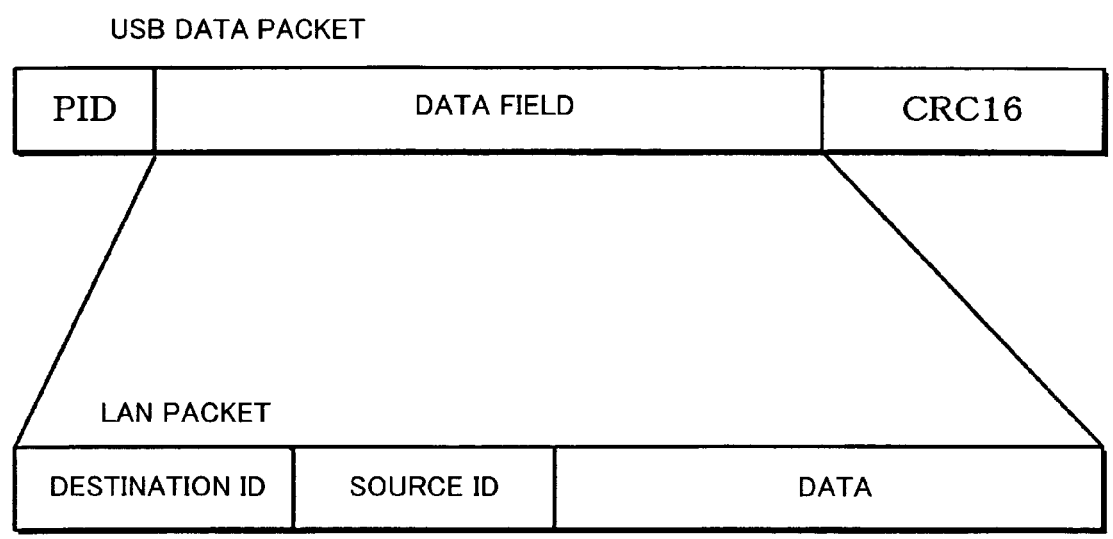
FIG. 9 shows examples of the formats of USB data packets and LAN packets.

Note that examples of the formats of USB data packets and LAN packets used in this embodiment are shown in FIG. 9. A USB data packet has fields for packet ID (PID), data, and CRC16. With this embodiment, a LAN packet is embedded in the data field of this USB data packet. This LAN packet has fields for a destination ID (destination information), a source ID (source information), and data (application data such as image data or sound data).

As shown at C6 of FIG. 8, by way of example, the USB device D1 transmits a USB data packet of the format shown in FIG. 9 to the host. At that point, the USB device D1 writes the ID of the USB device D4, which is the destination of the data transmission, into the destination ID field. It writes its own ID into the source ID field. It then transmits the thus-created USB data packet to the host.

When that happens, the host looks at the destination ID field in the LAN packet embedded in the data of the thus-received USB data packet, to determine the destination of the data transmission. It then issues an OUT token to the USB device D4 that is the destination, and transmits the USB data packet.

The USB device D4 can recognize that this is a LAN packet addressed to it, by looking at the destination ID within the LAN packet of the thus-received USB packet. It can also recognize that the source of the transmission was the USB device D1 by looking at the source ID within the LAN packet. It can perform various types of processing (such as image processing, sound processing, or print processing) buy using the data (such as image data, sound data, or print data) within the data field of the LAN packet.

Figure 10:
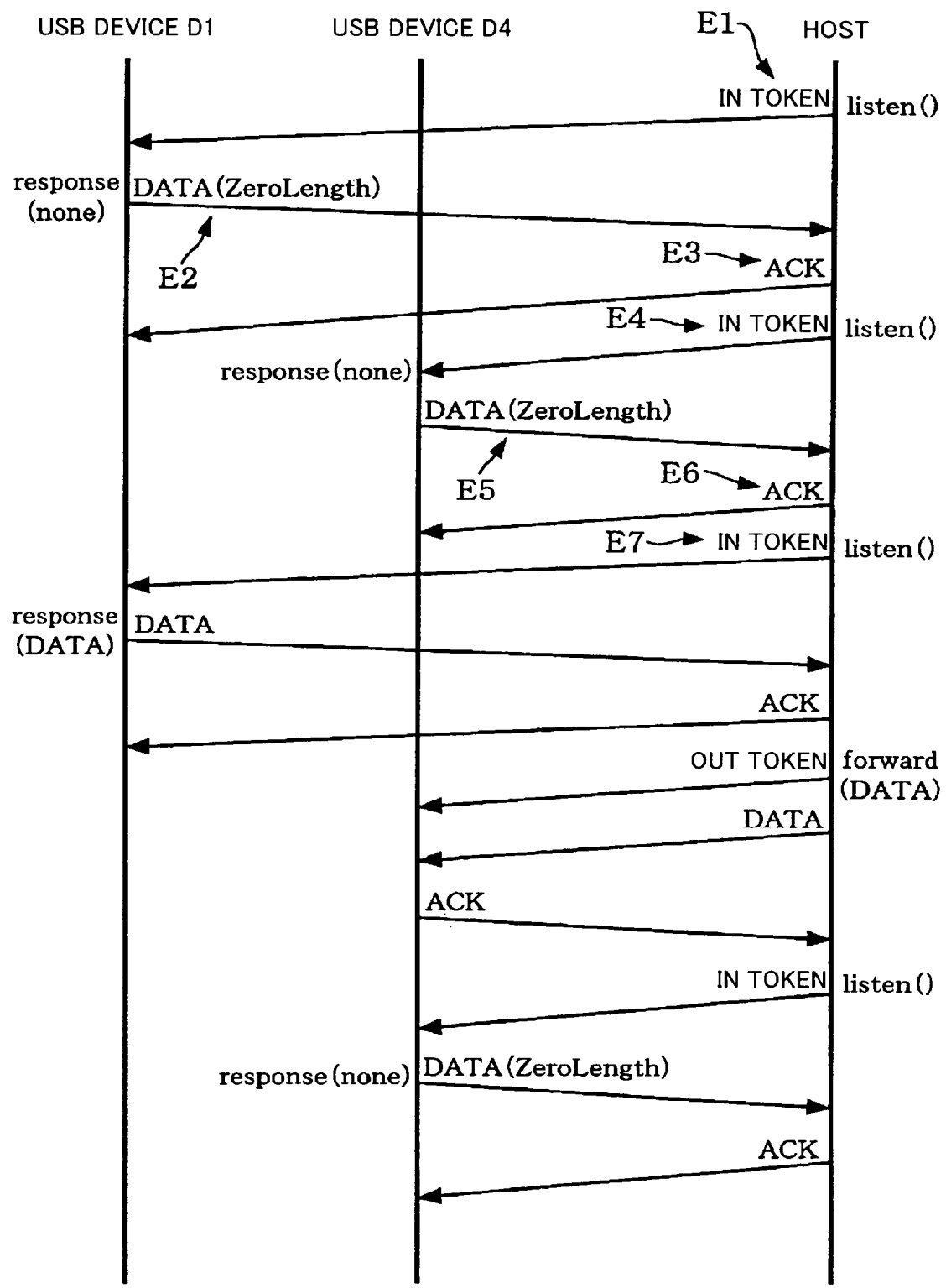
FIG. 10 is further illustrative of data transfer by transaction level.

Note that the description of FIG. 8 is based on the assumption that the USB device transmits NAK in response to the IN token issued by the host, but the present invention can also be applied to a case in which the USB transmits a zero-length packet in response to the IN token, as shown in FIG. 10.

For example, the host could issue an IN token to the USB device D1 at E1 in FIG. 10. The USB device D1 transmits a zero-length packet (a data packet of zero length) in response to the IN token at E2. When the host succeeds in receiving that zero-length packet, it transmits an ACK handshake packet to the USB device D1, as shown at E3. Since the host has received the zero-length packet from the USB device D1, this time it issues an IN token to the USB device D4, as shown at E4. When the USB device D4 transmits a zero-length packet to the host in response to the IN token, as shown at E5, the host transmits the ACK handshake packet to the USB device D4, as shown at E6.

The hose again issues an IN token to the USB device D1, as shown at E7. In this manner, FIG. 10 shows that if the host (the host controller) has received a zero-length packet from a USB device in response to an IN token it has issued, it next sequentially issues IN tokens to other USB devices.

Note that the present invention is not limited to these embodiments and thus various modifications thereto are possible within the scope of the invention laid out herein.

For example, the configuration of the data transfer control device of the present invention is not limited to that described with reference to FIGS. 2 and 5. In addition, the data transfer control method of the present invention is not limited to that described with reference to the embodiments herein, and various modifications thereto are possible.

In addition, terminology (such as: host controller •peripheral controller, the USB device D1, the USB device D4 ) that is derived from generic terminology defined within this document and these figures (such as: transfer controller, first USB device, second USB device) could be replaced by other generic terminology used within this document and these figures.

It is also possible for an aspect of the present invention that is defined by a dependent claim to omit some of the configurational requirements of the corresponding antecedent claim. Similarly, the components of the present invention defined by an independent claim can also be allocated to other independent claims.

The present invention can be applied to a data transfer control method under USB 1.1, USB 2.0, or standards based on a similar concept to those standards, or standards developed from those standards.

Various features relating to the above description will be shown below.

According to one embodiment of the present invention, there is provided a data transfer control device for a host which transfers data through a universal serial bus (USB), the data transfer control device comprising:

a data buffer which temporarily stores transfer data; and
a transfer controller which controls data transfer, wherein:
the transfer controller issues IN tokens to a plurality of USB devices connected to the USB including a first USB device and a second USB device; and
when data including destination information which specifies the second USB device as a destination has been transmitted from the first USB device and received by the transfer controller in response to an IN token issued to the first USB device, the transfer controller issues an OUT token to the second USB device and transmits the received data from the first USB device to the second USB device.

With this embodiment, an IN token is issued to a USB device. If data including destination information from the first USB device is received in response to that IN token, an OUT token is issued to the second USB device specified by the destination information, and the received data is transmitted to the second USB device. This makes it possible to implement data transfer using a USB device to operate as a LAN node or the like in the USB standard in which a host has the initiative.

The transfer controller may issue an IN token to at least one USB device which has declared itself to be a local area network (LAN) node among the USB devices connected to the USB.

This makes it possible to issue an IN token to the first USB device which has declared itself to be a LAN node, then transmit data received from that first USB device in response to the IN token, to the second USB device which has declared itself to be a LAN node.

The transfer controller may issue a device request which is GetDescriptor to each of the USB devices, receive a descriptor from each of the USB devices in response to the device request, and determine whether or not each of the USB device has declared itself to be a LAN node, based on the received descriptor.

This makes it possible to utilize USB control transfer to set a USB device which belongs to a LAN segment.

The transfer controller may sequentially issue an IN token to the remainder of the USB devices when the transfer controller receives a negative acknowledgment (NAK) from one of the USB devices in response to an issued IN token. Alternatively, the transfer controller may sequentially issue an IN tokens to the remainder of the USB devices when the transfer controller receives a zero-length packet from one of the USB devices in response to an issued IN token.

This makes it possible for a USB IN token to function like a token on a token bus.

The transfer controller may periodically issue an IN token to each of the USB devices by using interrupt transfer.

Alternatively, the transfer controller may issue an IN token periodically or non-periodically to each of the USB devices by using bulk transfer.

According to one embodiment of the present invention, there is provided an electronic instrument comprising the above-described data transfer control device and a plurality of USB ports used to connect the USB devices to the electronic instrument.

According to one embodiment of the present invention, there is provided a data transfer control device for a universal serial bus (USB) device which transfers data through a USB, the data transfer control device comprising:

a data buffer which temporarily stores transfer data; and
a transfer controller which controls data transfer, wherein:
when the data transfer control device has no data to be transmitted to another USB device, the data transfer controller transmits a negative acknowledgment (NAK) to a host in response to an IN token from the host; and
when the data transfer control device has data to be transmitted to another USB device, the data transfer controller transmits data including destination information which specifies another USB device as destination to the host in response to an IN token from the host.

With this embodiment, NAK is transmitted in response to the IN token when there is no data to be transmitted. If there is data to be transmitted, data (or a data packet of non-zero length) is transmitted in response to the IN token. This enables a USB device to operate as a LAN node in the USB standard in which a host has the initiative.

According to one embodiment of the present invention, there is provided a data transfer control device for a universal serial bus (USB) device which transfers data through a USB, the data transfer control device comprising:

a data buffer which temporarily stores transfer data; and
a transfer controller which controls data transfer, wherein:
when the data transfer control device has no data to be transmitted to another USB device, the data transfer controller transmits a zero-length packet to a host in response to an IN token from the host; and
when the data transfer control device has data to be transmitted to another USB device, the data transfer controller transmits data including destination information which specifies another USB device as destination to the host in response to an IN token from the host.

With this embodiment, a zero-length packet (or a data packet of zero length, or a short packet) is transmitted in response to the IN token when there is no data to be transmitted. If there is data to be transmitted, data (or a data packet of non-zero length) is transmitted in response to the IN token. This enables a USB device to operate as a LAN node in the USB standard in which a host has the initiative.

The transfer controller may transmit a descriptor including information of local area network (LAN) declaration to the host when the data transfer control device receives a device request of GetDescriptor from the host.

This makes it possible to utilize USB control transfer to implement LAN node declaration of a USB device.

According to one embodiment of the present invention, there is provided a data transfer control method for a host which transfers data through a universal serial bus (USB), the method comprising:

issuing IN tokens to a plurality of USB devices connected to the USB which includes a first USB device and a second USB device; and issuing an OUT token to the second USB device and transmitting data from the first USB device to the second USB device, when data including destination information which specifies the second USB device as a destination has been received in response to an IN token issued to the first USB device.

According to one embodiment of the present invention, there is provided a data transfer control method for a universal serial bus (USB) device which transfers data through a USB, the method comprising:

transmitting a negative acknowledgment (NAK) to a host in response to an IN token from the host when there is no data to be transmitted to another USB device; and transmitting data including destination information which specifies another USB device as destination to the host in response to an IN token from the host, when there is data to be transmitted to another USB device.

According to one embodiment of the present invention, there is provided a data transfer control method for a universal serial bus (USB) device which transfers data through a USB, the method comprising:

transmitting a zero-length packet to a host in response to an IN token from the host when there is no data to be transmitted to another USB device; and transmitting data including destination information which specifies another USB device as destination to the host in response to an IN token from the host, when there is data to be transmitted to another USB device.

What is claimed is:

1. A data transfer control device for a host which transfers data through a universal serial bus (USB), the data transfer control device comprising:

a data buffer which stores transfer data; and a transfer controller which controls data transfer, wherein:

the transfer controller issues IN tokens to a plurality of USB devices connected to the USB including a first USB device and a second USB device; and when data including destination information which specifies the second USB device as a destination has been received by the transfer controller from the first USB device in response to an IN token issued to the first USB device, the transfer controller issues an OUT token to the second USB device and transmits the data received from the first USB device by the transfer controller to the second USB device.

2. The data transfer control device as defined in claim 1, wherein the transfer controller issues an IN token to at least one USB device which has declared itself to be a local area network (LAN) node among the USB devices connected to the USB.

3. The data transfer control device as defined in claim 2, wherein the transfer controller issues a device request which is GetDescriptor to each of the USB devices, receives a descriptor from each of the USB devices in response to the device request, and determines whether or not each of the USB device has declared itself to be a LAN node, based on the received descriptor.

4. The data transfer control device as defined in claim 1, wherein the transfer controller sequentially issues an IN token to the remainder of the USB devices when the transfer controller receives a negative acknowledgment (NAK) from one of the USB devices in response to an issued IN token.

5. The data transfer control device as defined in claim 2, wherein the transfer controller sequentially issues an IN token to the remainder of the USB devices when the transfer controller receives a negative acknowledgment (NAK) from one of the USB devices in response to an issued IN token.

6. The data transfer control device as defined in claim 1, wherein the transfer controller sequentially issues an IN tokens to the remainder of the USB devices when the transfer controller receives a zero-length packet from one of the USB devices in response to an issued IN token.

7. The data transfer control device as defined in claim 2, wherein the transfer controller sequentially issues an IN tokens to the remainder of the USB devices when the transfer controller receives a zero-length packet from one of the USB devices in response to an issued IN token.

8. The data transfer control device as defined in claim 1, wherein the transfer controller periodically issues an IN token to each of the USB devices by using interrupt transfer.

9. The data transfer control device as defined in claim 2, wherein the transfer controller periodically issues an IN token to each of the USB devices by using interrupt transfer.

10. The data transfer control device as defined in claim 1, wherein the transfer controller issues an IN token periodically or nonperiodically to each of the USB devices by using bulk transfer.

11. The data transfer control device as defined in claim 2, wherein the transfer controller issues an IN token periodically or non-periodically to each of the USB devices by using bulk transfer.

12. An electronic instrument comprising:
the data transfer control device as defined in claim 1; and
a plurality of USB ports used to connect the USB devices to the electronic instrument.

13. An electronic instrument comprising:
the data transfer control device as defined in claim 2; and
a plurality of USB ports used to connect the USB devices to the electronic instrument.

14. The data transfer control device as defined in claim 1, wherein the transfer controller issues an IN token to at least one USB device which has declared itself to be a local area network (LAN) node among the USB devices connected to the USB, wherein when a USB data packet having a data field to which a LAN packet is set has been transmitted from the first USB device and received by the transfer controller in response to an IN token issued to the first USB device, the LAN packet having a destination ID, source ID and data, the transfer controller determines a destination based on the destination ID and issues an OUT token to the second USB device and transmits the received data from the first USB device to the second USB device when the determined destination is the second USB device.

* * * * *